(12) United States Patent
Wang

(10) Patent No.: US 12,078,230 B2
(45) Date of Patent: Sep. 3, 2024

(54) TRACTION SADDLE AND TRACTION PIN

(71) Applicant: Beijing Tusen Zhitu Technology Co., LTD., Beijing (CN)

(72) Inventor: Letian Wang, Beijing (CN)

(73) Assignee: BEIJING TUSEN ZHITU TECHNOLOGY CO., LTD. (CN)

( * ) Notice: Subject to any disclaimer, the term of this patent is extended or adjusted under 35 U.S.C. 154(b) by 0 days.

(21) Appl. No.: 18/423,670

(22) Filed: Jan. 26, 2024

(65) Prior Publication Data

US 2024/0167540 A1    May 23, 2024

Related U.S. Application Data

(63) Continuation of application No. 18/196,207, filed on May 11, 2023, now Pat. No. 11,920,662.

(30) Foreign Application Priority Data

May 18, 2022 (CN) .......................... 202210550558.1

(51) Int. Cl.
| | |
|---|---|
| *B60T 8/24* | (2006.01) |
| *B60D 1/24* | (2006.01) |
| *B60D 1/32* | (2006.01) |
| *B62D 13/00* | (2006.01) |
| *F16F 15/12* | (2006.01) |

(Continued)

(52) U.S. Cl.
CPC ............... *F16H 3/66* (2013.01); *B60D 1/249* (2013.01); *B60D 1/32* (2013.01); *B60T 8/248* (2013.01); *B60T 2230/06* (2013.01); *B60T 2250/03* (2013.01); *B60W 2300/145* (2013.01); *B62D 7/159* (2013.01); *B62D 13/00* (2013.01);

(Continued)

(58) Field of Classification Search
CPC .............. F16H 3/66; F16H 2200/2005; B60W 23/145; B60T 8/248; F16F 15/1206; F16F 15/13157; B60D 1/32; B60D 1/249; B60D 1/00–665; B60P 3/22; B60P 3/2215; B60P 3/222; B60P 3/2205–2245
See application file for complete search history.

(56) References Cited

U.S. PATENT DOCUMENTS

| | | |
|---|---|---|
| 5,733,218 A | 3/1998 | Sudau et al. |
| 9,133,885 B2 * | 9/2015 | Steinberger ............... F16D 3/14 |

(Continued)

FOREIGN PATENT DOCUMENTS

| | | |
|---|---|---|
| CN | 107554629 A | 1/2018 |
| CN | 212817670 U | 3/2021 |

(Continued)

*Primary Examiner* — Tinh Dang
(74) *Attorney, Agent, or Firm* — Genius Patent APC; Bruce Hare

(57) ABSTRACT

A traction saddle disposed on a tractor for connection with a traction pin of a trailer, is provided. The traction saddle includes a base, a gear set, and a damper. A gear carrier of the gear set fixes planetary gears of the gear set, the planetary gears are meshed with an inner ring gear of the gear set, and the inner ring gear is fixed to the base. The gear carrier is used for fixing the traction pin to rotate with the traction pin. The planetary gears are meshed with a sun gear of the gear set to drive the sun gear to rotate, and the damper is connected to the sun gear to apply resistance. In addition, a traction pin, a tractor, a trailer, and a truck are also provided.

20 Claims, 3 Drawing Sheets

(51) Int. Cl.
 _F16H 3/66_ (2006.01)
 _B62D 7/15_ (2006.01)
 _F16F 15/131_ (2006.01)

(52) U.S. Cl.
 CPC ....... _F16F 15/1206_ (2013.01); _F16F 15/1315_ (2013.01); _F16H 2200/2005_ (2013.01)

(56) References Cited

U.S. PATENT DOCUMENTS

| | | |
|---|---|---|
| 11,787,246 B2 | 10/2023 | Whipple |
| 2010/0105514 A1 | 4/2010 | Dames et al. |

FOREIGN PATENT DOCUMENTS

| | | |
|---|---|---|
| CN | 114007927 B | 9/2023 |
| CN | 219723308 U | 9/2023 |
| DE | 102011082647 A1 | 4/2012 |
| DE | 102020108003 A1 | 10/2020 |
| DE | 102022200804 A1 | 8/2022 |
| RU | 2604364 C1 | 12/2016 |

\* cited by examiner

TRACTION SADDLE AND TRACTION PIN

CROSS-REFERENCE TO RELATED APPLICATIONS

This patent document is a continuation of U.S. application Ser. No. 18/196,207, entitled, "TRACTION SADDLE AND TRACTION PIN" and filed on May 11, 2023. U.S. application Ser. No. 18/196,207 claims priority to Chinese Patent Application No. 202210550558.1, titled "TRACTION SADDLE AND TRACTION PIN", filed on May 18, 2022. The entire contents of the above-mentioned patent applications are incorporated by reference as part of the disclosure of this document. U.S. Patent Publication No. US 2023/0375077 A1 is incorporated by reference herein.

TECHNICAL FIELD

The present invention relates to the field of truck driving, and in particular to a traction saddle and a traction pin.

BACKGROUND

Generally, a semi-trailer truck is included of a tractor and one or more trailers. The tractor and the trailers are primarily connected by a traction saddle (also known as a fifth wheel) in combination with a traction pin. Since a semi-trailer truck is large in mass, it is difficult to guarantee the driving stability of the truck compared with a common small commercial vehicle. In addition, the mass of the trailer after being loaded is far larger than that of the tractor, so that the posture stability problem of the truck is more prominent during driving. When the truck is in a deceleration phase, particularly during a deceleration or braking operation in an emergency, it is possible that the trailer with a large momentum cannot synchronize with the control of the tractor and thereby leads to tractor-trailer jackknifing. This is extremely dangerous during driving. Since the traction saddle poses no limit on the degree of freedom of the trailer in the yaw direction, jackknifing still occurs in truck driving, whether better control of the tractor has been provided by manual or autonomous driving technology.

In addition, in the autonomous driving of commercial trucks, it is important to accurately measure the relative angular displacement of the tractor and the trailer. However, traction saddles generally do not provide a servo mechanism for measurement of the signal. If the hitch angle between the tractor and the trailer is to be estimated with a camera, the identifiable characteristics and the position of the trailer have to be pre-identified, which is not that suitable for different kinds of trailers.

SUMMARY

The present disclosure provides a traction saddle capable of inhibiting yawing of a trailer to improve posture stability during driving when a hitch angle between a tractor and the trailer is rapidly changed.

In one aspect, the present disclosure provides a traction saddle disposed on a tractor for connection with a traction pin of a trailer, wherein the traction saddle includes:
   a base including an accommodating space;
   a gear set disposed in the accommodating space and including:
      an inner ring gear fixed to the base;
      a plurality of planetary gears meshed with the inner ring gear;
   a gear carrier fixing axial centers of the plurality of planetary gears, wherein the gear carrier is used for fixing the traction pin to rotate with the traction pin; and
   a sun gear including opposite first and second ends, wherein the plurality of planetary gears are meshed with the first end to drive the sun gear to rotate; and
   a damper connected to the second end to apply resistance to the rotation of the sun gear.

In another aspect, the present disclosure provides a traction pin disposed on a trailer for connection with a traction saddle of a tractor, wherein the traction saddle includes a base, a gear set, and a damper, the gear set being connected between the base and the damper and including a gear carrier, and the traction pin includes:
   a pin; and
   a connecting disc fixing the pin to rotate with the pin, wherein a disc surface of the connecting disc is perpendicular to the pin, and the connecting disc is used for being fixed on the gear carrier to receive resistance applied by the damper.

In another aspect, the present disclosure provides a tractor for connection with a trailer including a traction pin, wherein the tractor includes the traction saddle described above for connection with the traction pin.

In another aspect, the present disclosure provides a trailer for connection with a tractor including a traction saddle, wherein the trailer includes the traction pin described above for connection with the traction saddle.

In another aspect, the present disclosure provides a truck including:
   a trailer; and
   the tractor described above connected to the trailer.

In another aspect, the present disclosure provides a truck including:
   a tractor; and
   the trailer described above connected to the tractor.

Based on the above disclosure, the damper of the traction saddle is connected to one end of the sun gear, the plurality of planetary gears are meshed with the other end of the sun gear, and the gear carrier fixes axial centers of the plurality of planetary gears and is used for fixing the traction pin. Therefore, the resistance that the damper applies to the rotation of the sun gear can be transmitted to the traction pin, and it is capable of inhibiting yawing of the trailer through the traction pin to improve posture stability of the truck during driving when the hitch angle between the tractor and the trailer is rapidly changed. In addition, the gear change of the sun gear reflects the change in the hitch angle, and also provides room for measurement of the signal. Further, the traction pin includes the connecting disc fixed to the pin, and the connecting disc provides a larger contact surface to be fixed to the gear carrier. Thus, the combination with the traction saddle described above enables the resistance generated by the damper to be effectively transmitted to the trailer, further improving the posture stability of the truck during driving.

BRIEF DESCRIPTION OF THE DRAWINGS

The accompanying drawings illustrate the exemplary embodiments and constitute a part of the specification, and, together with the text description of the specification, are provided to illustrate the exemplary implementations of the embodiments. It is obvious that the accompanying drawings described below are only some embodiments of the present invention. For one of ordinary skilled in the art, other accompanying drawings can be derived from the accompa

DETAILED DESCRIPTION

In order to enable those skilled in the art to better understand the technical solutions of the present invention, the technical solutions in the embodiments of the present invention will be clearly and completely described below with reference to the drawings in the embodiments of the present invention. It is obvious that the described embodiments are only part of the embodiments of the present invention rather than all of the embodiments. All other embodiments obtained by those skilled in the art without making any creative effort based on the embodiments of the present invention shall fall within the protection scope of the present invention.

In the present disclosure, unless otherwise specified, the term "a plurality of" means two or more. In the present disclosure, unless otherwise specified, the terms "first", "second", and the like are used for distinguishing between similar objects and are not intended to limit position relationships, timing relationships, or importance relationships thereof. It is to be understood that the terms used in this manner are interchangeable under appropriate circumstances so that the embodiments of the present invention described herein can be implemented in other manners in addition to those illustrated or described herein.

The traction saddle provided in the embodiments of the present invention can be applied to a tractor of a semi-trailer truck requiring manual driving and can also be applied to a tractor of a semi-trailer truck that is automatically driven or has assisted driving, and the application scenes are not strictly limited herein.

In addition, the traction pin provided in the embodiments of the present invention can be applied to a trailer of a semi-trailer truck requiring manual driving and can also be applied to a trailer of a semi-trailer truck that is automatically driven or has assisted driving, and the application scenes are not strictly limited herein.

Figure 1:
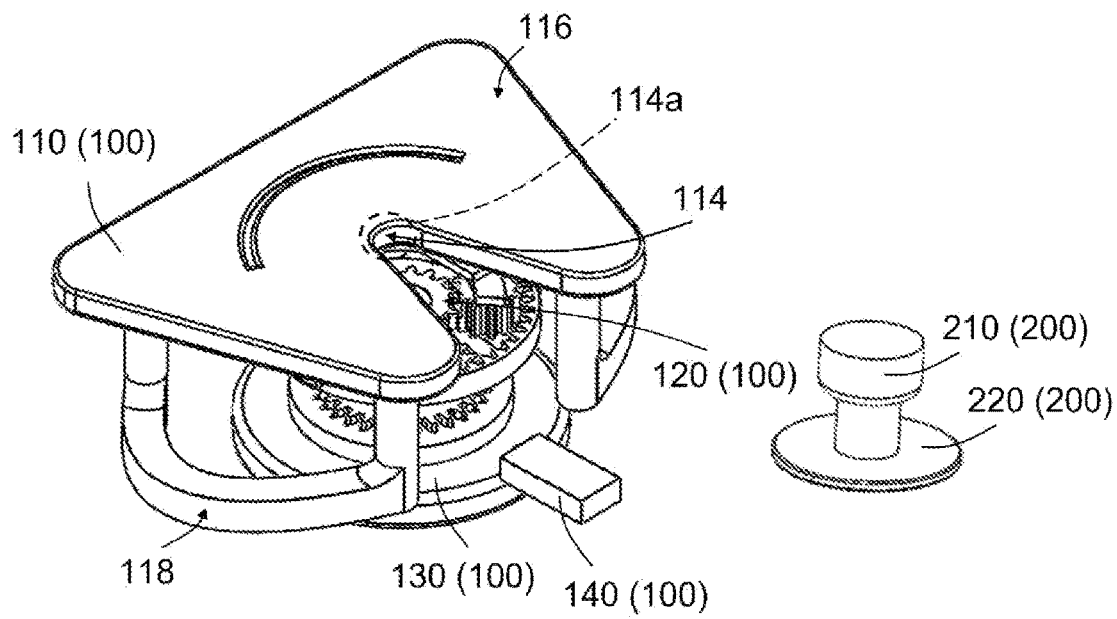
- FIG. 1 is a schematic structural diagram of a traction saddle and a traction pin in an embodiment of the present invention.
Figure 2:
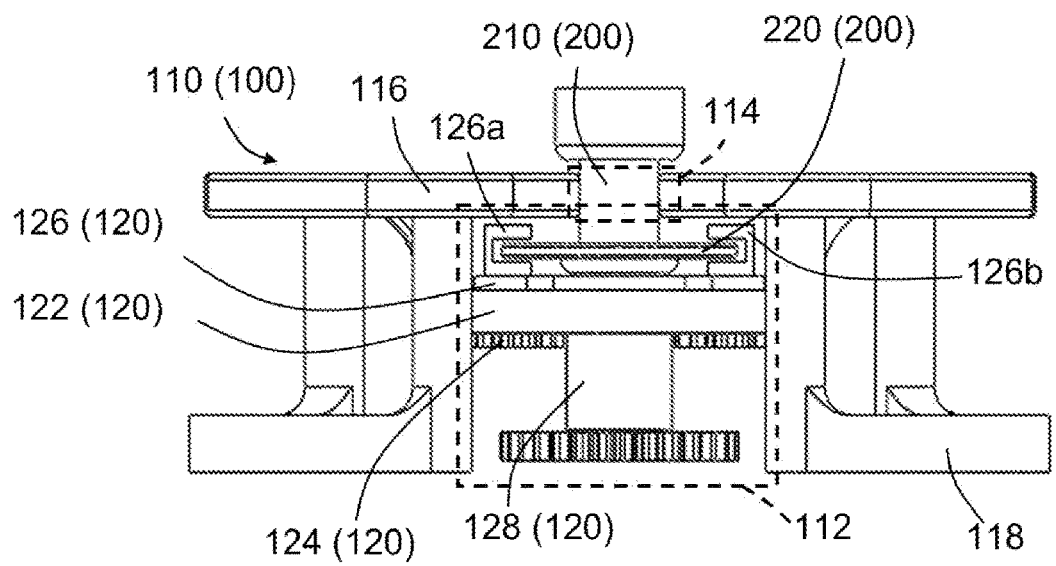
FIG. 2 is a side view of a gear carrier of the traction saddle fixing the traction pin (damper omitted) in an embodiment of the present invention.

Referring to FIG. 1 and FIG. 2. In this embodiment, a truck includes a tractor and a trailer. A traction saddle 100 is disposed on the tractor, and a traction pin 200 is disposed on the trailer. The traction saddle 100 is used for connection with the traction pin 200 of the trailer, and the traction pin 200 is also used for connection with the traction saddle 100 of the tractor. The traction saddle 100 includes a base 110, a gear set 120, and a damper 130. The base 110 includes an accommodating space 112 (as shown in FIG. 2). Specifically, the base 110 includes a housing 116, and the housing 116 defines the accommodating space 112. The housing 116 includes a notch 114 (as shown in FIG. 1) for receiving the traction pin 200, and the notch 114 includes an arcuate side wall 114a for abutting against the traction pin 200.

In one embodiment, when the tractor and the trailer are to be connected, the trailer remains stationary and the tractor reverses such that the traction pin 200 enters the notch 114. The traction saddle 100 further includes a locking mechanism (not shown) disposed at the notch 114. When the traction pin 200 enters the notch 114 and is in a predetermined position, the locking mechanism limits movement of the traction pin. The predetermined position may be in fact a position in a space in which the traction pin 200 is movable that is defined by the arcuate side wall 114a and when the locking mechanism is locked, or may be other defined positions. In addition, the base 110 further includes a supporting base 118 connected to the housing 116 and used for mounting the traction saddle 100 on the tractor. Specifically, the housing 116 and the supporting base 118 together define the accommodating space 112 for accommodating the gear set 120 described above. In some embodiments, the damper 130 and other members may also be accommodated in the accommodating space 112.

Figure 3:
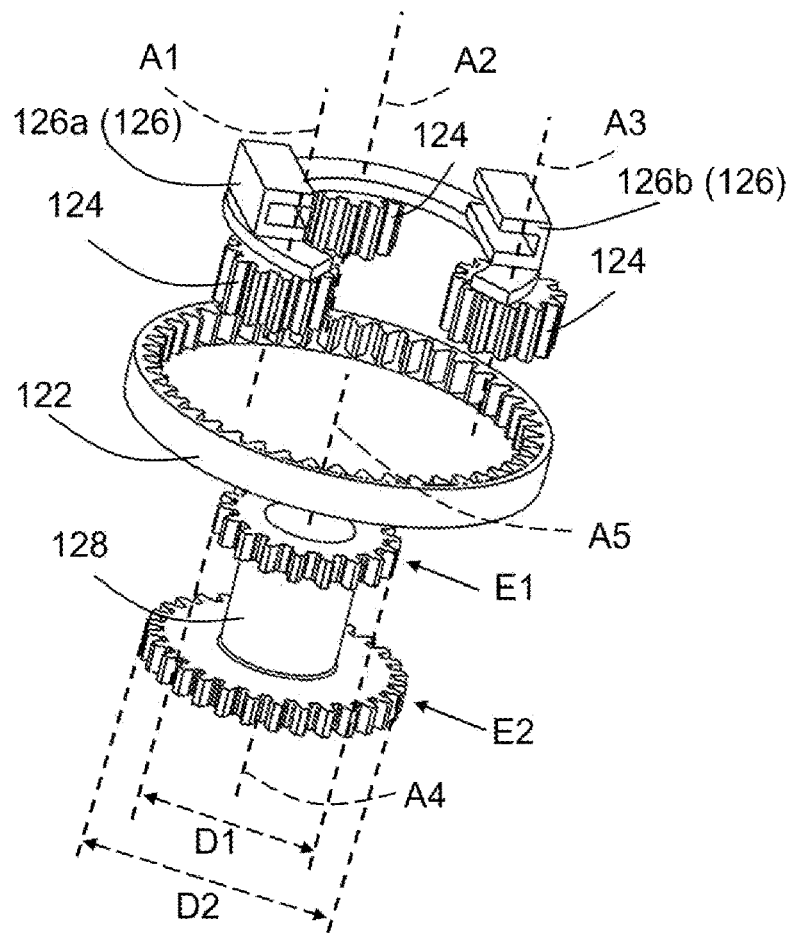
FIG. 3 is an exploded view of the gear carrier of the traction saddle in an embodiment of the present invention.

Referring to FIG. 2 and FIG. 3. In this embodiment, the gear set 120 of the traction saddle 100 is disposed in the accommodating space 112. The gear set 120 includes an inner ring gear 122, a plurality of planetary gears 124, a gear carrier 126, and a sun gear 128. The inner ring gear 122 is fixed to the base 110, for example, by locking, bonding, welding, or other mechanical or non-mechanical means. The inner ring ear 122 may be fixed to the housing 116 and the supporting base 118 of the base 110 or other members of the base 110, such that the inner ring gear 122 does not rotate relative to the component to which it is fixed. However, in some embodiments, the inner ring gear 122 may also be designed to rotate relative to the component to which it is fixed, which is not limited by the present invention. In this embodiment, a composite material may be filled between the inner ring gear 122 and the base 110 to act as a buffer and thereby to improve the overall structural stability of the traction saddle 100. For example, the composite material may buffer disturbances caused by forward and backward displacement of the trailer, preventing impact on and abrasion of the traction saddle 100.

Figure 4:
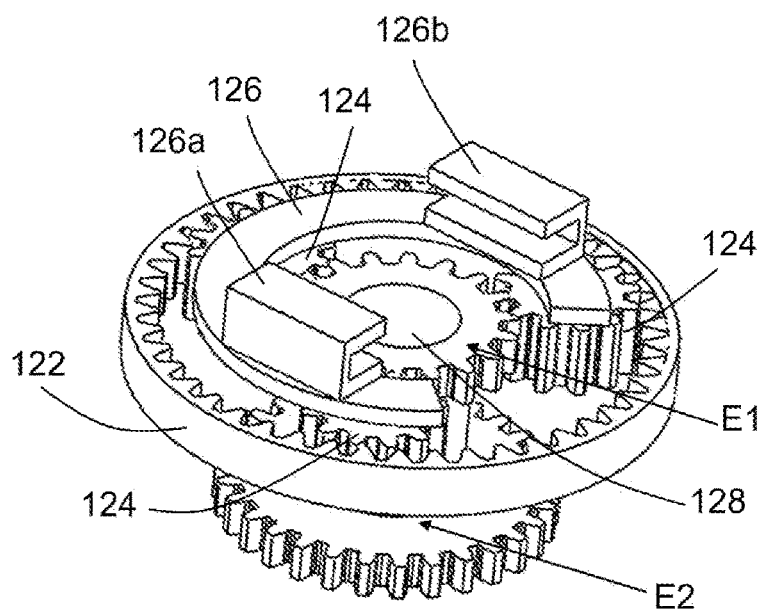
FIG. 4 is a schematic structural diagram of the gear carrier of the traction saddle in an embodiment of the present invention.

Referring to FIG. 3 and FIG. 4. The inner ring gear 122 is, for example, a ring structure, and includes gear teeth disposed on the inner side of the ring structure. The gear carrier 126 includes a partial or complete ring structure, and the gear carrier 126 fixes axial centers of the plurality of planetary gears 124 (for example, axial centers of the axis of rotation A1, the axis of rotation A2, and the axis of rotation A3 of the three planetary gears 124 shown in FIG. 3). The number of the plurality of planetary gears 124 is three, and the three planetary gears 124 are equally distributed on the circle that the ring structure of the gear carrier 126 surrounds. The number of the plurality of planetary gears 124 may also be designed to be more than three according to stability or other industrial requirements, which is not limited by the present invention. In this embodiment, the locking mechanism of the traction saddle 100 described above is also located between the gear carrier 126 and the housing 116, in addition to being located at the notch 114. The locking mechanism of the traction saddle 100 may also be disposed at other positions in the accommodating space 112 or on the housing 116. The locking mechanism includes, for example, a U-shaped plate, a barrier plate, and a spring. When the traction pin 200 has not entered the predetermined position of the notch 114, the opening of the U-shaped plate is oriented in the same direction as the notch 114 to receive the traction pin 200. When the traction pin 200 enters the notch 114 and is at the predetermined position, the opening of the U-shaped plate is rotated to the side, and the barrier plate is returned under the action of the spring to hold the U-shaped plate, so that the traction pin 200 is positioned between the U-shaped plate and the arcuate side wall 114a, thus limiting the movement of the traction pin 200.

In this embodiment, the sun gear 128 includes opposite first and second ends E1 and E2. The sun gear 128 has, for example, a cylindrical structure, and the first end E1 and the second end E2 of the sun gear 128 are located at two ends, respectively, of the sun gear 128 in a direction of an axis of rotation A4 thereof. Referring to FIG. 4, the plurality of planetary gears 124 are meshed with the inner ring gear 122, and the plurality of planetary gears 124 are also meshed with the first end E1 to drive the sun gear 128 to rotate. Specifically, the first end E1 and the second end E2 of the sun gear 128 are disposed with gear teeth, and the plurality of planetary gears 124 are meshed with the gear teeth of the first end E1. In general, the gear set 120 of the traction saddle 100 is connected between the base 110 and the damper 130. The damper 130 is connected to the second end E2 to apply resistance to the rotation of the sun gear 128.

Figure 5:
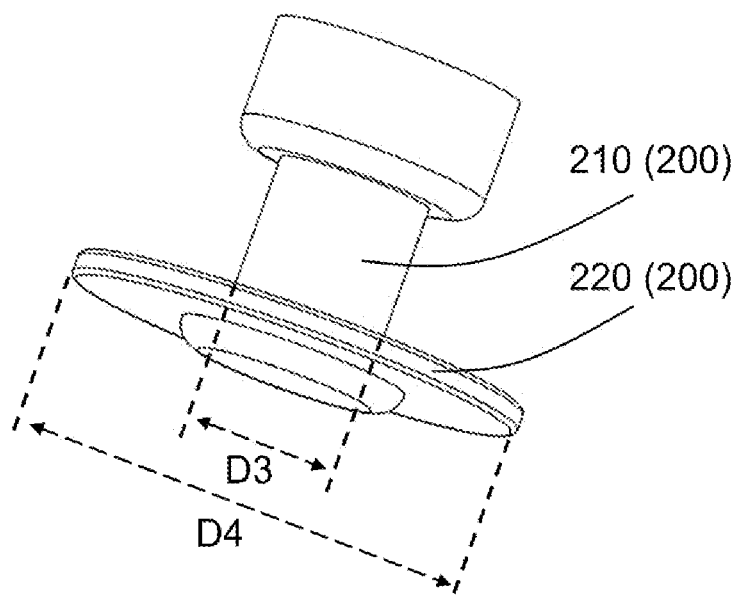
FIG. 5 is a schematic structural diagram of the traction pin in an embodiment of the present invention.

Referring to FIG. 2, FIG. 4 and FIG. 5, the traction pin 200 includes a pin 210 and a connecting disc 220. The connecting disc 220 fixes the pin 210 to rotate with the pin 210, and a disc surface of the connecting disc 220 is perpendicular to the pin 210. The connecting disc 220 and the pin 210 may be integrally formed through a mold, and the connecting disc 220 and the pin 210 may also be fixed together through welding, hinges or mechanical connections. When the traction pin 200 is mounted to the bottom of the trailer, the swaying of the trailer can be reflected in the rotation of the pin 210 and also in the rotation of the connecting disc 220 during driving. In this embodiment, the gear carrier 126 of the traction saddle 100 is used for fixing the traction pin 200 to rotate with the traction pin 200. In addition, the connecting disc 220 is fixed on the gear carrier 126 to allow the pin 210 to drive the connecting disc 220 and the gear carrier 126 to rotate. The gear carrier 126 includes, for example, clamping structures (e.g., the clamping structures 126a, 126b in FIG. 4) for clamping the connecting disc 220. The clamping structures 126a, 126b may be calipers, and may be moved in a perpendicular direction by electromagnetic force, hydraulic force, spring force, and the like. After the traction pin 200 is connected to the traction saddle 100, the caliper may be reset to press tight the connecting disc 220, allowing the connecting disc 220 to rotate simultaneously with the gear carrier 126 via frictional force. The connecting disc 220 may be made of a material with a high coefficient of friction, such as a material with a coefficient of friction between 0.3 and 0.7.

Figure 6:
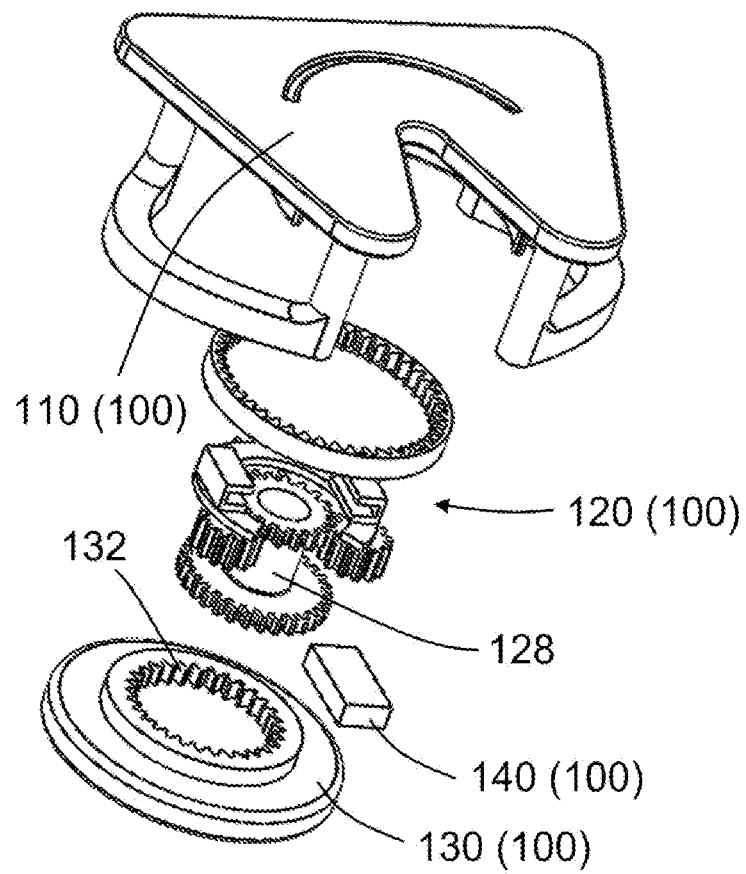
FIG. 6 is an exploded view of the traction saddle in an embodiment of the present invention.

When the traction pin 200 enters the notch 114 and is at the predetermined position described above, the gear carrier 126 fixes the connecting disc 220 to allow the pin 210 to drive the connecting disc 220 and the gear carrier 126 to rotate. Referring to FIG. 3, in this embodiment, the sun gear 128 is coaxial with the inner ring gear 122, that is, the axis of rotation A4 of the sun gear 128 and the axis of rotation A5 of the inner ring gear 122 are substantially the same. When the traction pin 210 is fixed by the gear carrier 126, the rotation of the traction 210 pin drives, via the gear carrier 126, the plurality of planetary gears 124 to revolve within the inner ring gear 122 along the axis of rotation A4 of the sun gear 128 and drives the sun gear 128 to self-rotate. In this embodiment, the damper 130 of the traction saddle 100 is, for example, a rotary damper having a damping gear 132 (as shown in FIG. 6), and the damping gear 132 is meshed with the gear teeth of the second end E2 of the sun gear 128. The damper 130 provides the sun gear 128 with force against the direction of the self-rotation to inhibit, via the gear set 120 and the traction pin 200, the swaying of the trailer. Specifically, the resistance applied by damper 130 of the traction saddle 100 to the rotation of the sun gear 128 may be transmitted to the connecting disc 220 fixed on the gear carrier 126 via at least the sun gear 128, the plurality of planetary gears 124, and the gear carrier 126, such that connecting disc 220 receives the resistance applied by the damper 130. Then, the resistance applied by the damper 130 can be transmitted to the trailer through the connecting disc 220 and the pin 210, thus inhibiting yawing of the trailer.

In some embodiments, the connection between the rotary damper and the sun gear 126 may be through a chain or other mechanisms, and the damper 130 may also apply resistance to the rotation of the sun gear 126 through a motor-generator device, which is not limited by the present invention. In some embodiments, the damper 130 may also include a motor-generator device, which may be a permanent magnet synchronous motor, a DC brushless motor, or a DC excited motor. During normal driving, the change in the hitch angle between the tractor and the trailer is transmitted to the motor rotor through the gear set 120 and the connection part (e.g., the sun gear 128) of the gear set 120 and the motor-generator device. The rotor cuts the magnetic field of the stator to generate induced electromotive force, and further, the induced current is generated, and the battery is charged through an inverter or other devices for recovering a part of energy. In an emergency, for example, when the motor speed suddenly increases beyond a predetermined threshold, the motor controller may increase the magnetic field strength of the stator and increase the resistance torque received by the motor rotor. This resistance torque is further transmitted to the traction pin 200 of the trailer through the gear set 120, thereby inhibiting high-frequency changes in the hitch angle.

In this embodiment, response of the damper 130 of the traction saddle 100 to the sun gear 128 is directly proportional to a rotational angular speed of the sun gear 128. That is, the damper 130 inhibits rapid or high-frequency changes in the hitch angle between the tractor and the trailer, which typically occur during deceleration or braking operations in an emergency. When the hitch angle changes slowly or at a low frequency, the damper 130 has a small response to the sun gear 128 and thereby a small influence on the driving operation. In one embodiment, when the hitch angle is greater than 90° due to torque imbalance between the tractor and the trailer caused by sudden braking of the truck, the tractor and the trailer are more prone to jackknife Assume that a conventional 8-ton tractor is carrying a 40-ton fully loaded trailer and is traveling on the road on a rainy day. Its road adhesion coefficient is assumed to be 0.6. Assume that the truck brakes urgently at an initial state of traveling at an initial speed of 70 kilometers per hour (km/h). In the case that the front and rear wheels are locked at the same time as the truck follows an ideal braking force distribution, the time required from braking in a state of 70 km/h to stopping is 3.3 seconds (s). If jackknifing occurs at this time (i.e., the hitch angle is greater than 90°), the average traction angular speed is 0.476 radians per second (rad/s). Specifically, since the torque imbalance generated during braking is a cause of the generation of the traction angular speed, in this example, the traction angular speed gradually increases throughout the braking, and when the hitch angle between the tractor and the trailer changes at an angular speed of 0.476 rad/s or more, the tractor and the trailer are more likely to jackknife. At this time, the damper 130 of the traction saddle 100 significantly inhibits the relatively high-frequency change in the hitch angle to improve the posture stability of the truck during driving and avoid the occurrence of jackknifing.

In this embodiment, the swaying of the trailer drives the traction pin 200 to rotate, and a direction of the self-rotation of the sun gear 128 is the same as a direction of the rotation of the traction pin 200. The gear set 120 of this embodiment has the following gearing relationship:

$$n_1 + a \times n_2 = (1+a) * n_3$$

$$a = z_2/z_1$$

where, the above $n_1$ is the rotational speed of the sun gear 128, $n_2$ is the rotational speed of the inner ring gear 122, $n_3$ is the rotational speed of the gear carrier 126, $z_1$ is the number of teeth of the sun gear 128, and $z_2$ is the number of teeth of the inner ring gear 122. Specifically, the plurality of planetary gears 124 are meshed with the inner ring gear 122 and roll along the inner ring gear 122, and the plurality of planetary gears 124 are also meshed with the sun gear 128 and revolve relative to the sun gear 128, so that the number of teeth of each of the plurality of planetary gears 124 must be designed to match the number of teeth of the sun gear 128. In this embodiment, when the inner ring gear 122 is locked due to being fixed to the base 110, $n_2$ is zero. At this time, the rotational speed $n_1$ of the sun gear 128 is (1+a) times the rotational speed $n_3$ of the gear carrier 126, and since a is greater than zero, the rotational angle of the sun gear 128 is greater than that of the gear carrier 126.

Referring to FIG. 1 and FIG. 6. In this embodiment, the traction saddle 100 further includes an angle measurer 140 disposed on one side of the sun gear 128 to measure the rotation of the sun gear 128. The angle measurer 140 includes at least one of a Hall-effect sensor and a photoelectric encoder. The angle measurer 140 may also include other types of angle measurers that measure the rotation of the sun gear 128 in a contact or non-contact manner. The angle measurer 140 may measure the second end E2 of the sun gear 128, or may measure the first end E1 or other positions of the sun gear 128 without affecting the operation of the gear set 120. The angle measurer 140 may be disposed in the accommodating space 112 or disposed outside the base 110, which is not limited by the present invention.

Specifically, the swinging of the trailer reflects the rotation of the connecting disc 220 of the traction pin 200 and thereby reflects the rotation of the gear carrier 126. Thus, the swaying of the trailer drives the traction pin 200 to rotate by a first angle, and the swaying drives the sun gear 128 to rotate by a second angle. The second angle is greater than the first angle. That is, the rotational angle of the sun gear 128 is greater than that of the gear carrier 126, and an angle amplification effect is achieved in angel measuring, which is beneficial for a more precise measurement of the hitch angle. Since the sun gear includes opposite first and second ends E1 and E2, and the change in the second end E2 of the sun gear reflects the precise change in the hitch angle, the traction saddle 100 of the embodiments of the present invention provides room for measuring the hitch angle and higher precision. In some embodiments, the accommodating space 112 and the second end E2 of the sun gear also provide room for measuring other types of signals.

Referring to FIG. 3 and FIG. 5. In this embodiment, to achieve better torque transmission, in designing the size of the connecting disc 220, what also need to be considered are the size limitation of the clamping structures 126a, 126b of the gear carrier 126, the limitation of the deformation resistance of the material, and the convenience of the combination of the trailer and the tractor. Specifically, a ratio of a diameter D4 of the connecting disc 220 to a diameter D3 of the pin 210 (i.e., the diameter of the cylinder of the pin 210) is between 1.8 and 2.2.

In this embodiment, a ratio of a diameter D1 of the sun gear 128 at the first end E1 to the diameter D3 of the pin 210 is between 0.8 and 1.2. The design of the diameter D1 of the sun gear 128 influences the number of teeth of the sun gear 128 at the first end E1, which thereby influences the gearing relationship of the gear set 120. In addition, a diameter D2 of the sun gear 128 at the second end E2 is greater than the diameter D1 of the sun gear 128 at the first end E1, but it should be able to be disposed in the accommodating space 112. A ratio of the diameter D2 of the sun gear 128 at the second end E2 to the diameter D1 of the sun gear 128 at the first end E1 is between 2.5 and 3.0.

Specifically, a ratio of the diameter D4 of connecting disc 220 to the diameter D1 of the sun gear 128 at the first end E1 is between 1.5 and 2.75. When the ratio is greater than or equal to 1.5, the clamping structures 126a, 126b and the connecting disc 220 can be more stably fixed together. When the ratio is less than or equal to 2.75, the difficulty in combining the trailer and the tractor caused by the excessively large designed size of the connecting disc 220 can be avoided. In addition, a ratio of the diameter D1 of the sun gear 128 at the first end E1 to the diameter D2 of the sun gear 128 at the second end E2 is between 0.22 and 0.6. When the ratio is greater than or equal to 0.22, the risk of the sun gear 128 being in collision with the base 110 or other members caused by the excessively large designed size of the sun gear can be avoided. When the ratio is less than or equal to 0.6, a better connection of the damper 130 to the second end E2 of the sun gear 128 can be achieved, increasing the stability of the traction saddle 100. Specifically, the diameter D4 of connecting disc 220 is, for example, between 13 cm and 17 cm. In some embodiments, the size of the sun gear 128, the size of the pin 210, and the size of the connecting disc 220 may be set according to actual requirements, which is not limited by the present invention.

In this embodiment, the damper 130 of the traction saddle 100 is connected to the second end E2 of the sun gear 128, the plurality of planetary gears 124 are meshed with the first end E1 of the sun gear 128, and the gear carrier 126 fixes axial centers of the plurality of planetary gears 124 and is also used for fixing the traction pin 200. Therefore, the resistance that the damper 130 applies to the rotation of the sun gear 128 can be transmitted to the traction pin 200, and it is capable of inhibiting yawing of the trailer through the traction pin 200 to improve posture stability of the truck during driving when the hitch angle between the tractor and the trailer is rapidly changed. In addition, the gear change of the sun gear 128 reflects the change in the hitch angle, and also provides room for measurement of the signal. Further, the traction pin 200 of this embodiment includes the connecting disc 220 fixed to the pin 210, and the connecting disc 220 provides a larger contact surface to be fixed to the gear carrier 126. Thus, the traction pin 200, in combination with the traction saddle 100 described above, enables the resistance generated by the damper 130 to be effectively transmitted to the trailer, further improving the posture stability of the truck during driving.

In some embodiments, a truck includes a trailer and a tractor connected to the trailer. The tractor includes the traction saddle 100 described above for connection with a traction pin of the trailer. The traction pin may be the traction pin 200 described above or may be a traction pin having other structures, which is not limited by the present invention.

In some embodiments, a truck includes a tractor and a trailer connected to the tractor. The trailer includes the traction pin 200 described above for connection with a traction saddle of the tractor. The traction saddle may be the traction saddle 100 described above or may be a traction saddle having other structures, which is not limited by the present invention.

Although exemplary embodiments or examples of the present disclosure have been described with reference to the accompanying drawings, it should be understood that the above exemplary discussion is not intended to be exhaustive or to limit the present invention to the precise forms disclosed. Many modifications and variations are possible in view of the above teachings. Therefore, the disclosed subject matter should not be limited to any single embodiment or example described herein, but rather should be construed in breadth and scope in accordance with the appended claims.

What is claimed is:

1. A truck, comprising:
   a trailer comprising a traction pin; and
   a tractor, connected to the trailer, the tractor comprising a traction saddle for connection with the traction pin, the traction saddle comprising:
      a base;
      a gear set disposed in the base and comprising:
         an inner ring gear fixed to the base;
         a plurality of planetary gears meshed with the inner ring gear;
         a gear carrier fixing the plurality of planetary gears, wherein the gear carrier is used for fixing the traction pin to rotate with the traction pin; and
         a sun gear, wherein the plurality of planetary gears are meshed with the sun gear to drive the sun gear to rotate; and
      a damper connected to the sun gear to apply resistance.

2. The truck according to claim 1, wherein the traction pin comprises a pin and a connecting disc, wherein the connecting disc fixes the pin to rotate with the pin, a disc surface of the connecting disc is perpendicular to the pin, and the connecting disc is used for being fixed on the gear carrier to allow the pin to drive the connecting disc and the gear carrier to rotate.

3. The truck according to claim 2, wherein the base comprises a housing defining an accommodating space, the gear set is disposed in the accommodating space, the housing comprises a notch for receiving the traction pin, and the gear carrier fixes the connecting disc when the traction pin enters the notch and is in a predetermined position.

4. The truck according to claim 2, wherein the plurality of planetary gears are meshed with an end of the sun gear to drive the sun gear to rotate, a ratio of a diameter of the connecting disc to a diameter of the sun gear at the end is between 1.5 and 2.75.

5. The truck according to claim 2, wherein the gear carrier comprises clamping structures thereon for clamping the connecting disc.

6. The truck according to claim 1, wherein the gear carrier fixes axial centers of the plurality of planetary gears, the sun gear is coaxial with the inner ring gear, and when the traction pin is fixed by the gear carrier, rotation of the traction pin drives, via the gear carrier, the plurality of planetary gears to revolve within the inner ring gear along an axis of rotation of the sun gear and drives the sun gear to self-rotate, wherein swaying of the trailer drives the traction pin to rotate by a first angle, and the swaying drives the sun gear to rotate by a second angle, wherein the second angle is greater than the first angle, wherein a direction of the self-rotation of the sun gear is the same as a direction of the rotation of the traction pin, and wherein the damper provides the sun gear with force against the direction of the self-rotation to inhibit, via the gear set and the traction pin, the swaying of the trailer.

7. The truck according to claim 1, wherein the sun gear comprises opposite first and second ends, the plurality of planetary gears are meshed with the first end to drive the sun gear to rotate, the damper is connected to the second end to apply resistance to the rotation of the sun gear.

8. The truck according to claim 7, wherein the first end and the second end of the sun gear are located at two ends, respectively, of the sun gear in a direction of an axis of rotation thereof, the plurality of planetary gears are meshed with gear teeth of the first end, the damper is a rotary damper having a damping gear, and the damping gear is meshed with gear teeth of the second end.

9. The truck according to claim 7, wherein a ratio of a diameter of the sun gear at the first end to a diameter of the sun gear at the second end is between 0.22 and 0.6.

10. The truck according to claim 1, wherein the traction saddle further comprises an angle measurer disposed on one side of the sun gear to measure the rotation of the sun gear, and wherein response of the damper to the sun gear is directly proportional to a rotational angular speed of the sun gear.

11. A trailer for connection with a tractor comprising a traction saddle, comprising a traction pin for connection with the traction saddle, wherein the traction saddle comprises a base, a gear set, and a damper, the gear set being connected between the base and the damper and comprising a gear carrier, and the traction pin comprises:
    a pin; and
    a connecting disc fixing the pin to rotate with the pin, wherein the connecting disc is used for being fixed on the gear carrier to receive resistance applied by the damper.

12. The trailer according to claim 11, wherein the gear set further comprises an inner ring gear, a plurality of planetary gears, and a sun gear, the inner ring gear is fixed to the base, the plurality of planetary gears are meshed with the inner ring gear and are also meshed with the sun gear, and the damper applies resistance to rotation of the sun gear, wherein a ratio of a diameter of the connecting disc to a diameter of the sun gear at an end is between 1.5 and 2.75.

13. The trailer according to claim 12, wherein when the connecting disc is fixed on the gear carrier, rotation of the traction pin drives, via the gear carrier, the plurality of planetary gears to revolve within the inner ring gear along an axis of rotation of the sun gear and drives the sun gear to self-rotate, wherein swaying of the trailer drives the traction pin to rotate by a first angle, and the swaying drives the sun gear to rotate by a second angle, wherein the second angle is greater than the first angle, and wherein a direction of the self-rotation of the sun gear is the same as a direction of the rotation of the traction pin.

14. The trailer according to claim 11, wherein the base comprises a housing comprising a notch for receiving the traction pin, and the connecting disc is fixed on the gear carrier when the traction pin enters the notch and is in a predetermined position.

15. The trailer according to claim 11, wherein a disc surface of the connecting disc is perpendicular to the pin, and wherein a ratio of a diameter of the connecting disc to a diameter of the pin is between 1.8 and 2.2.

16. A truck, comprising:
a tractor comprising a traction saddle; and
a trailer, connected to the tractor, the trailer comprising a traction pin for connection with the traction saddle, wherein the traction saddle comprises a base, a gear set, and a damper, the gear set being connected between the base and the damper and comprising a gear carrier, and the traction pin comprises:
a pin; and
a connecting disc fixing the pin to rotate with the pin, wherein the connecting disc is used for being fixed on the gear carrier to receive resistance applied by the damper.

17. The truck according to claim 16, wherein the gear set further comprises an inner ring gear, a plurality of planetary gears, and a sun gear, the inner ring gear is fixed to the base, the plurality of planetary gears are meshed with the inner ring gear and are also meshed with the sun gear, and the damper applies resistance to rotation of the sun gear, wherein a ratio of a diameter of the connecting disc to a diameter of the sun gear at an end is between 1.5 and 2.75.

18. The truck according to claim 17, wherein when the connecting disc is fixed on the gear carrier, rotation of the traction pin drives, via the gear carrier, the plurality of planetary gears to revolve within the inner ring gear along an axis of rotation of the sun gear and drives the sun gear to self-rotate, wherein swaying of the trailer drives the traction pin to rotate by a first angle, and the swaying drives the sun gear to rotate by a second angle, wherein the second angle is greater than the first angle, and wherein a direction of the self-rotation of the sun gear is the same as a direction of the rotation of the traction pin.

19. The truck according to claim 16, wherein the base comprises a housing comprising a notch for receiving the traction pin, and the connecting disc is fixed on the gear carrier when the traction pin enters the notch and is in a predetermined position.

20. The truck according to claim 16, wherein a disc surface of the connecting disc is perpendicular to the pin, and wherein a ratio of a diameter of the connecting disc to a diameter of the pin is between 1.8 and 2.2.

* * * * *